April 21, 1936.  A. PRABELL  2,037,821
REENFORCED BAKEPAN UNIT
Filed March 5, 1935  2 Sheets-Sheet 1
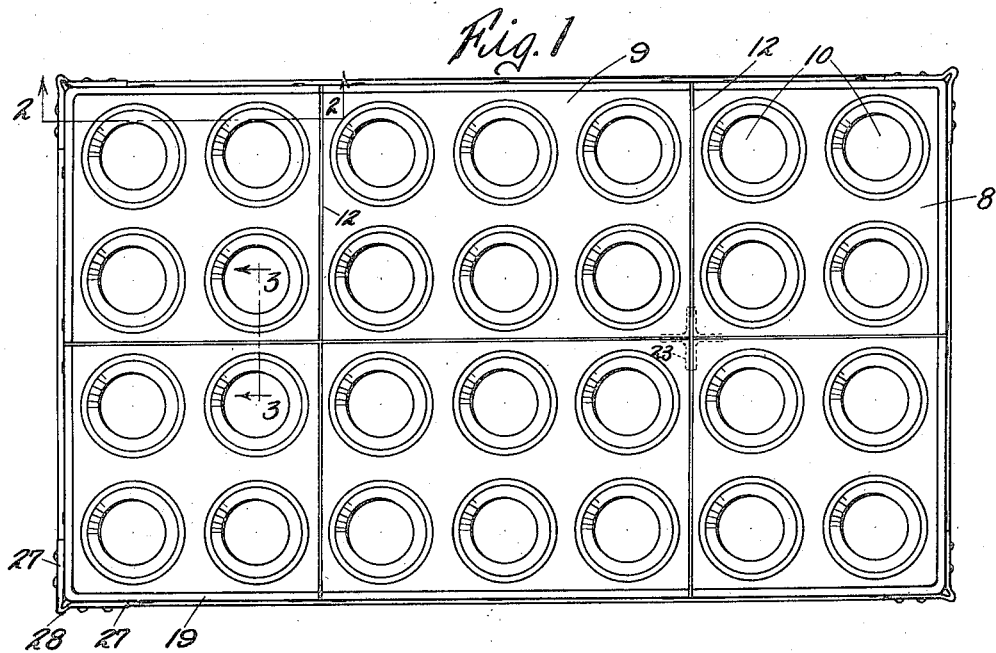
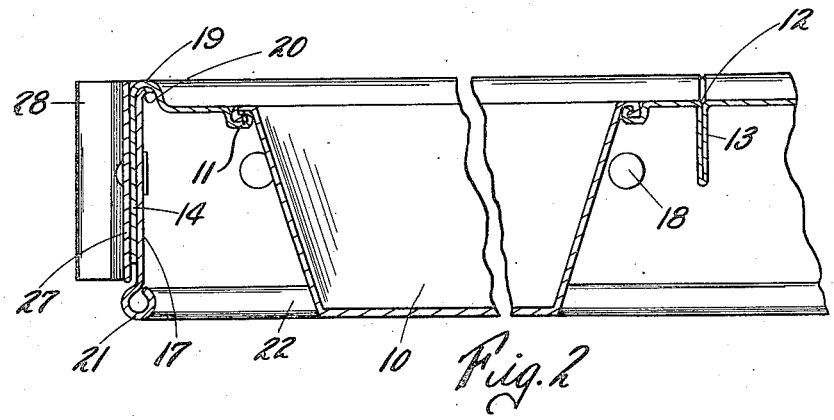
Inventor
Albert Prabell

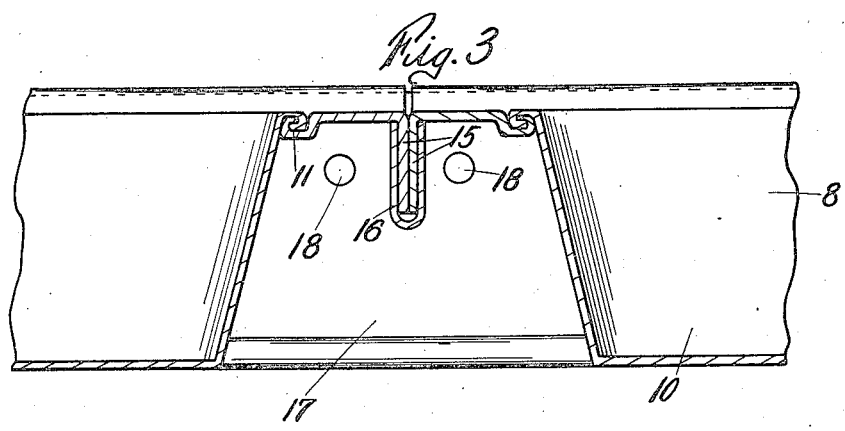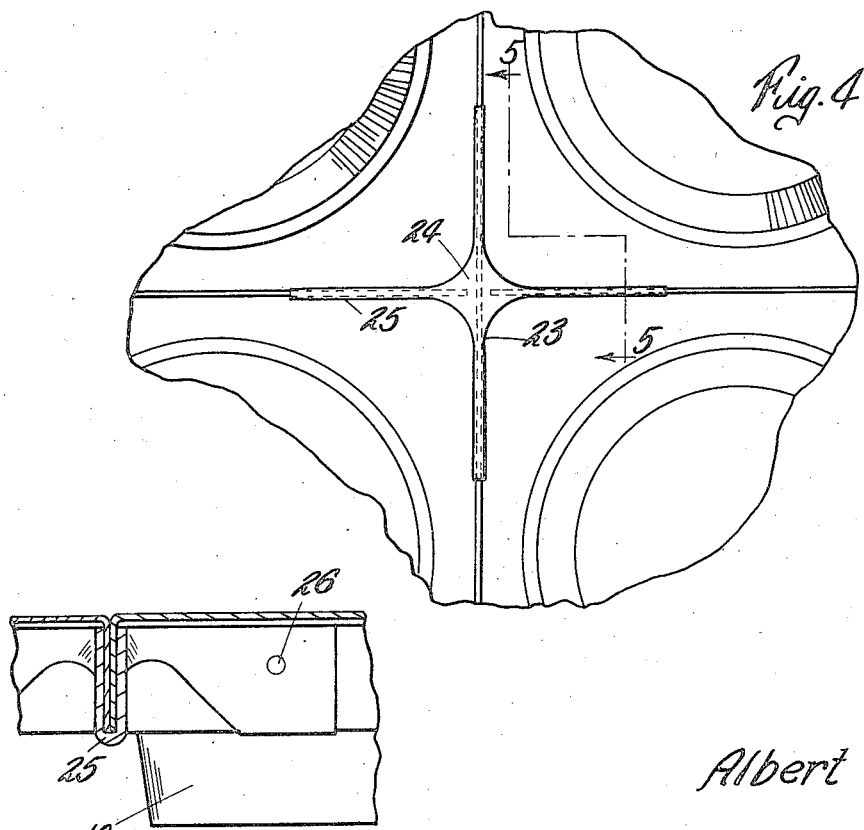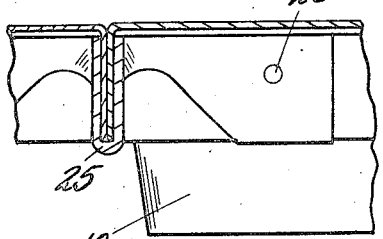

Patented Apr. 21, 1936

2,037,821

UNITED STATES PATENT OFFICE 2,037,821

REENFORCED BAKEPAN UNIT

Albert Prabell, Bellevue, Ky., assignor to The Lockwood Manufacturing Company, Cincinnati, Ohio, a corporation of Ohio Application March 5, 1935, Serial No. 9,463

8 Claims. (Cl. 53—6)

This invention relates to an improved bake pan unit of the type generally utilized in the making of cup cakes or similar baked goods, that is, to a bake unit which comprises an upper supporting surface having associated therewith a plurality of individual baking receptacles, the whole being supported upon shallow lateral walls.

An object of the invention is to provide a bake unit of the kind described possessed of unusual rigidity and wear resistant properties so that the unit is enabled to withstand both tortional strains and the frequent forcible blows and rough handling to which devices of this kind are subjected.

Another object is to provide such a bake unit wherein the main portions of the unit are integral and rigid members whereby both efficient manufacture and prolonged use are assured. These and other objects are attained by the means described herein and illustrated in the accompanying drawings, in which:

Fig. 1 is a top plan view of a bake unit comprising the features of the present invention.

Figs. 2 and 3 are cross sectional views taken on lines 2—2 and 3—3 respectively, of Fig. 1.

Fig. 4 is a fragmental bottom plan view of the bake unit of this invention.

Fig. 5 is a cross sectional view taken on line 5—5 of Fig. 4.

Heretofore baking pans of the kind here under consideration have been formed of a number of units and of various connection details which as a whole represented a comparatively large number of parts ill adapted to withstand the rough usage to which devices of the kind in question are constantly subjected. In this connection it may be pointed out that after bake units of this kind have been used, it is common for the handler to bump or knock the unit on one of its corners to loosen the baked goods and remnants thereof from the various receptacles forming the unit. Thereafter, it is common, after the units have been cleansed, to shift them to a common point and stack them in nested relationship to effect economy in storage space. It is apparent therefore that during all the periods of its handling, a baking unit of the kind under contemplation is under constant strain. If, as above suggested, the unit has been formed of a large number of parts, it is obvious that these eventually become loosened no matter how rigidly they may have been joined originally.

The present invention substantially eliminates the undesirable features above described by providing an integral one-piece upper or receptacle-supporting surface so formed at intervals as to provide transverse integral strengthening ribs whereby a unit is not only integral throughout the greater part of its make up but is likewise reenforced in the manner described. The integral body described is further provided with reenforced peripheral strap means specifically adapted to withstand the wearing abrasion of the baker's peel and similar tools, and the lateral walls so reenforced are further strengthened against distortion by novel bumper means at the corners where the greatest wear normally occurs. The present invention likewise provides for a novel and unusually rigid connection of one of the integral body units with another for forming the enlarged type of baking unit frequently utilized in modern bakeries.

In greater detail and with reference to the drawings: The baking unit of the present invention may comprise one or more elongated and substantially rectangular sheets of metal 8 forming the upper surface 9 of a bake unit and adapted to have a plurality of individual baking receptacles 10 associated therewith. The baking receptacles 10 may be joined to said top surface in any suitable way such as the interlocking connection 11 seen in Figs. 2 and 3, it being obvious that the individual receptacles are associated with circular apertures provided in the top surface 9. The sheet 8, in accordance with the present invention, is bent double upon itself as at 12 to provide a transverse integral strengthening rib 13 (Fig. 2). Any desired number of these strengthening ribs may be formed, there being two in the device illustrated and which are regularly spaced at calculated intervals, so as to produce the greatest amount of strength and rigidity.

The baking unit as herein shown is formed of two of the sheets 8, both of which are provided at similar points with the strengthening ribs 13 so that, in effect, these ribs extend across the total width of the unit. Both sheets 8 have their edge portions turned downwardly for forming the flanges 14 extending completely around the periphery of each sheet 8. It is obvious that the surplus material resulting at the extreme ends of the transverse ribs described may be clipped off to permit the proper down turning and formation of the flanges 14. It will be seen that the two sheets 8 are adapted to be disposed side by side in a common plane and the central contacting flanges 15 of the two sheets thus disposed may be rigidly connected together by a binding strip 16 V-shaped in cross section (Fig. 3), the connection between the flanges and the strip being suitably effected such as by spotwelding. The connection strip 16 may extend the full length of the baking unit and forms, with its enclosed flanges 15, an unusually sturdy longitudinally extending strengthening rib.

The meeting points or intersections of the transverse strengthening ribs with the longitudinal rib may be reenforced by the use of a cross clip 23 (Figs. 1, 4, and 5) comprising a central body 24 having arms 25 which are doubled longitudinally upon themselves to embrace the adjacent portions of the longitudinal and transverse ribs. As seen in Fig. 5, the arms 25 may be spotwelded as at 26 to their respective ribs. The cross bracing thus provided at the intersection points described render the total under-structure of the bake pan unit of the greatest firmness and rigidity.

The peripheral flanges 14 of the baking unit body thus formed are adapted to have associated therewith, according to the present invention, a continuous metal strap 17. This has been shown in the present embodiment as being disposed underneath the flanges 14, being connected thereto by means such as the rivets 18. The upper edge of the strap 17 may be disposed, as seen in Fig. 2, in an inverted upwardly projecting channel 19 formed integrally around the edges of the top surface 9 of the unit, the extreme top edge of the strap being bent slightly as at 20 for giving rigidity to the upstanding channel described which latter is therefore adapted to serve as an additional edge reenforcing means for the unit. The bottom edge of the strap 17, as disclosed in the present invention, is rolled upon itself as at 21 (Fig. 2) to form a continuous bead 22 which projects below the flanges 14 and likewise below the longitudinal and transverse strengthening ribs already described. This bead substantially precludes distortion of the unit at this point and likewise provides for the ready insertion of handling tools, such as the baker's peel, beneath the lower edge of the unit. It is obvious likewise that the tubular form of the bead is adapted for indefinitely long periods of use despite the forcible wear to which this portion of the unit is necessarily subjected.

The present invention provides for corner bumpers on the unit since it is at these points that the unit is bumped or knocked after articles have been baked in order to loosen these articles and likewise the food remnants within the individual baking receptacles 10. The bumpers may comprise each a resilient metal strip having its end portions 27 riveted, spotwelded, or otherwise secured to the corner portions of the shallow lateral walls of the unit constituted by the flanges 14 and strip 17. The intermediate section of the bumper is bent outwardly to form a resilient loop member 28 (Figs. 1 and 2). The bumpers so formed protect the baking units during shifting and movement thereof as well as during the final bumping operation above described.

It will be apparent that the unit herein described is extremely rigid throughout all its details. It is further apparent that due to the integral construction of the main body portions, that is, the sheets 8, the number of parts of the unit have been materially reduced so as to render the latter substantially integral. Modifications suggest themselves upon consideration of the means disclosed herein, but these are believed to be comprised within the spirit and scope of this invention.

What is claimed is:

1. A bake pan unit comprising a single sheet of metal forming the top surface of the unit and adapted to have individual baking receptacles associated therewith, a portion of said sheet being bent double to provide a downwardly projecting strengthening rib, and lateral walls associated with said sheet and extending downwardly thereof.

2. A bake pan unit comprising a single sheet of metal forming the top surface of the unit and adapted to have individual baking receptacles associated therewith, portions of said sheet being bent double to provide spaced downwardly-projecting strengthening ribs, lateral downwardly-extending flanges on said sheet, and a reenforcing strap attached to said flanges and projecting below said ribs and flanges.

3. A bake pan unit comprising a single sheet of metal forming the top surface of the unit and adapted to have individual baking receptacles associated therewith, portions of said sheet being bent double to provide spaced downwardly-projecting strengthening ribs, lateral downwardly-extending flanges on said sheet, a reinforcing strap attached to and coextensive with said flanges, and a continuous bead at the lower edge of the strap and extending below said ribs and flanges to provide a reenforced pan-supporting edge adapted to withstand the abrasive contact of handling tools and the like.

4. A reenforced bake pan unit comprising a substantially rectangular sheet of metal forming the top surface of the unit and adapted to have individual baking receptacles associated therewith, downwardly-projecting walls attached to said sheet, and bumpers embracing the corner portions of said walls, each bumper consisting of a strip having its end sections secured to said walls and its intermediate section doubled outwardly to provide a resilient vertical loop member adapted to absorb the shocks and wear resultant upon the bumping or knocking of the unit during movement thereof and in loosening baked goods therefrom.

5. A reenforced bake pan unit comprising a substantially rectangular sheet of metal forming the top surface of the unit and adapted to have individual baking receptacles associated therewith, lateral downwardly-projecting flanges on said sheet, a strap attached to and co-extensive with said flanges, and forming therewith reenforced edge walls for the unit, a continuous bead at the lower edge of the strap and extending below said flanges to provide a reenforced pan-supporting edge, and a bumper at each corner of the unit, said bumper comprising a strip having its end sections secured to said walls and its intermediate sections doubled outwardly to provide a resilient vertical loop member adapted to absorb the shocks and wear resultant upon the bumping or knocking of the unit during movement thereof and in loosening baked goods therefrom.

6. A bake pan unit comprising a pair of metal sheets disposed side by side in a common plane, said sheets forming the top surface of the unit and being adapted to have individual baking receptacles associated therewith, similar portions of each sheet being bent double to form spaced downwardly-projecting strengthening ribs extending transversely of the sheets, downwardly-directed flanges provided at the edges of the sheets, and means connecting and reenforcing the central adjacently-disposed flanges to provide a connection and reenforcement rib extending longitudinally of the said sheets.

7. A bake pan unit comprising a pair of metal sheets disposed side by side in a common plane, said sheets forming the top surface of the unit and being adapted to have individual baking receptacles associated therewith, similar portions of each sheet being bent double to form spaced downwardly-projecting strengthening ribs extending transversely of the sheets, downwardly-directed flanges provided at the edges of the sheets, means connecting and reenforcing the central adjacently-disposed flanges to provide a connection and reenforcement rib extending longitudinally of said sheets, and means secured to said transverse and longitudinal ribs at the intersections thereof for further rigidifying the ribs and the unit.

8. A baking pan unit comprising a single sheet of metal forming the top surface of the unit and adapted to have individual baking receptacles associated therewith, and a downwardly-projecting strengthening rib formed by doubling the sheet upon itself between the baking receptacles at one or more places to provide a selected number of the strengthening ribs.

ALBERT PRABELL.